(12) United States Patent
Saye

(10) Patent No.: US 6,367,197 B1
(45) Date of Patent: Apr. 9, 2002

(54) IRRIGATION APPARATUS

(76) Inventor: Quintin W. Saye, 20079 Ford Rd., Cherryvale, KS (US) 67335

( * ) Notice: Subject to any disclaimer, the term of this patent is extended or adjusted under 35 U.S.C. 154(b) by 0 days.

(21) Appl. No.: 09/372,906

(22) Filed: Aug. 12, 1999

(51) Int. Cl.⁷ .............................................. A01G 27/00
(52) U.S. Cl. ...................................................... 47/48.5
(58) Field of Search .................................... 47/48.5, 79

(56) References Cited

U.S. PATENT DOCUMENTS

| | | |
|---|---|---|
| 73,442 A | 1/1868 | Fish |
| 291,947 A | 1/1884 | Skillen |
| 3,345,774 A | 10/1967 | Delbuguet .................. 47/48.5 |
| 3,754,352 A | 8/1973 | Bates .......................... 47/48.5 |
| 3,856,205 A | 12/1974 | Rohling ........................ 239/63 |
| 4,361,983 A | 12/1982 | Wilson ........................ 47/48.5 |
| 4,499,686 A | 2/1985 | Scragg ........................ 47/48.5 |
| 4,866,880 A | 9/1989 | Weinblatt ........................ 47/79 |
| 4,882,874 A | * 11/1989 | Paulson et al. ............... 47/1.5 |
| 5,172,515 A | 12/1992 | Lapshansky, Sr. et al. ... 47/48.5 |
| 5,273,066 A | * 12/1993 | Graham et al. .......... 47/48.5 X |
| 5,282,874 A | * 2/1994 | Tsukagoshi ................ 47/1.1 R |
| 5,398,445 A | 3/1995 | Lemons ...................... 47/48.5 |
| 5,533,300 A | 7/1996 | Kesler ........................ 47/48.5 |
| 5,618,000 A | 4/1997 | Lantzy et al. ............... 239/276 |
| 5,806,240 A | 9/1998 | Racine ........................... 47/79 |
| 5,809,692 A | 9/1998 | Kesler ........................ 47/48.5 |
| 5,836,106 A | 11/1998 | Alex ........................... 47/48.5 |
| 6,243,986 B1 | * 6/2001 | Crowley ..................... 47/48.5 |
| 2001/0007184 A1 | * 7/2001 | Lee ............................. 47/48.5 |

FOREIGN PATENT DOCUMENTS

JP 410042725 A * 2/1998

OTHER PUBLICATIONS

Gardener's Supply Company, Summer 1999 Catalog, pp. 9 and 68.
Aqua Spike Water Saver, Printed Information On Packaging, Griffiths & Beerens PTY. LTD., Melbourne, Australia.

* cited by examiner

Primary Examiner—Charles T. Jordan
Assistant Examiner—Jeffrey L. Gellner
(74) Attorney, Agent, or Firm—William R. Sharp

(57) ABSTRACT

An irrigation apparatus is disclosed herein which comprises: a tubular injector having an outwardly and radially extending peripheral shoulder, an upper portion extending above the shoulder to an upper inlet, and a lower portion having a plurality of outlet holes and extending below the shoulder to a lower end so that at least a lowermost section of the lower portion is tapered; and a reservoir having an open top and a substantially closed bottom with an opening sized to exteriorly and removably mate with the upper portion of the tubular injector.

11 Claims, 3 Drawing Sheets

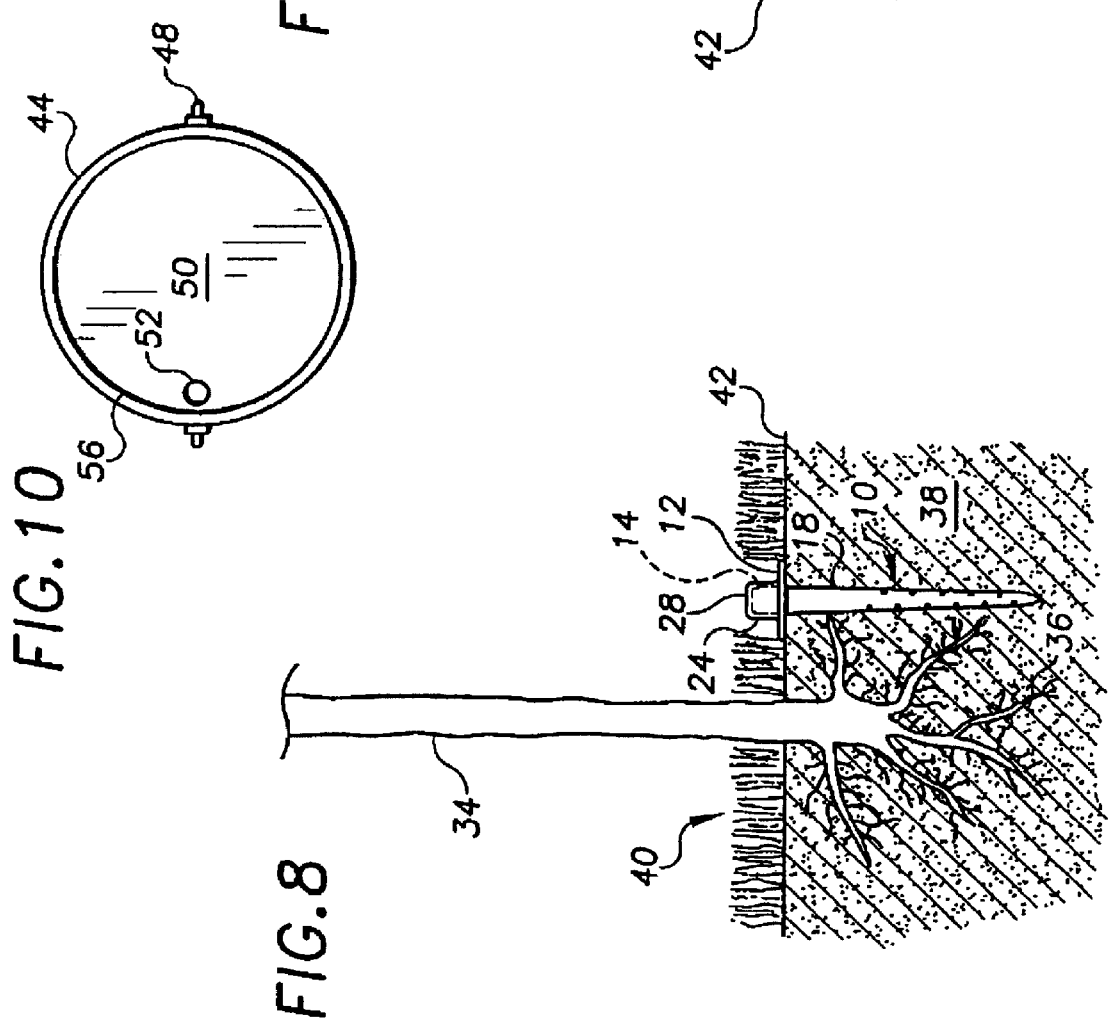

IRRIGATION APPARATUS

BACKGROUND OF THE INVENTION

The invention relates to an irrigation apparatus that is particularly suitable for the convenient and efficient watering of young trees. Of course, the irrigation apparatus can be used to similarly water other types of plants.

Trees are most commonly watered with a garden hose. However, this irrigation technique is highly inefficient. In time, the soil surface around a tree tends to become crusted over, which results in poor percolation of water through the soil and consequent runoff. This problem is compounded if the immediately adjacent landscape is sloped, and also if dry weather conditions persist. Decreasing the flow from the hose to a rate that matches achievable percolation may minimize runoff, but much more time is required. Slowly watering one tree at a time can become very time consuming, and will often result in watering one tree all day while other trees remain dry.

Various irrigation devices have been developed and patented over the years in an attempt to overcome the above-mentioned problems. The general design of such irrigation devices includes a tubular injector having an upper inlet and outlet holes below the upper inlet. The injector is inserted into the soil at an appropriate location near the tree, and a source of water is provided to communicate with the upper inlet of the injector. Consequently, water flows downwardly through the interior of the injector and then exits through the outlet holes so as to flow into the soil and be absorbed by the roots. Although such prior irrigation devices have worked satisfactorily to some extent, further improvement would be desirable.

SUMMARY OF THE INVENTION

It is an object of the invention to provide an improved irrigation apparatus that is convenient, easy to use, and highly efficient.

It is also an object of the invention to provide an irrigation apparatus having an injector that can be left in the ground if desired and mated with a reservoir whenever it is desired to water the tree or other plant.

The above objects are realized, as will be apparent from the following Detailed Description, by an irrigation apparatus comprising: a tubular injector having an outwardly and radially extending peripheral shoulder, an upper portion extending above the shoulder to an upper inlet, and a lower portion having a plurality of outlet holes and extending below the shoulder to a lower end so that at least a lowermost section of the lower portion is tapered; and a reservoir having an open top and a substantially closed bottom with an opening sized to exteriorly and removably mate with the upper portion of the tubular injector.

BRIEF DESCRIPTION OF THE DRAWINGS

FIG. 8 is a view of the injector with its lower portion extending into soil that is adjacent to roots of a small tree. The injector is shown as it appears when not in use with the cap fitted over the upper portion.

FIG. 9 is a view of the injector during use in watering the tree. The cap has been removed and a reservoir filled with water is mated with the upper portion of the injector.

FIG. 10 is a bottom view of the reservoir as removed from the injector.

DETAILED DESCRIPTION OF THE INVENTION

A detailed description of a preferred embodiment of the invention will now be described with reference to the drawings. Some specific dimensions and angles are given in this description for illustrative purposes only, and should not be construed to limit the invention in any manner.

Figure 2:
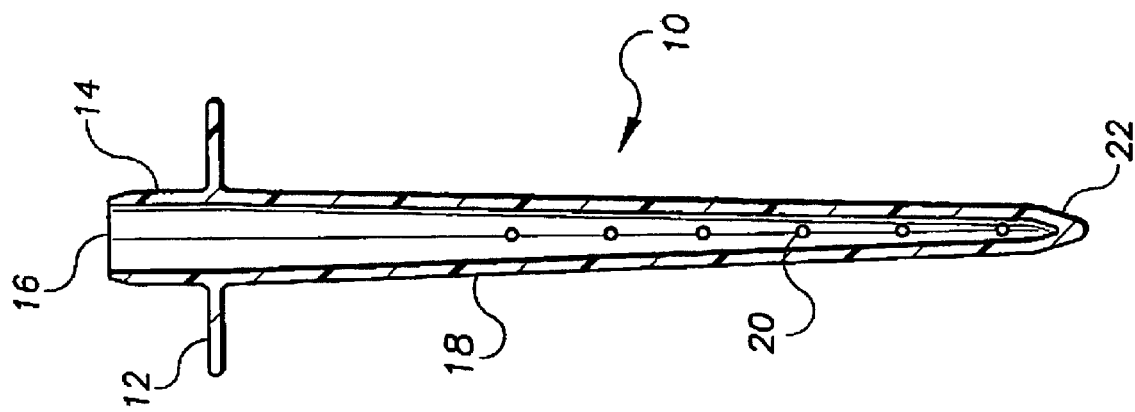
FIG. 2 is a cross-sectional view of the injector of FIG. 1, rotated 45°.
Figure 1:
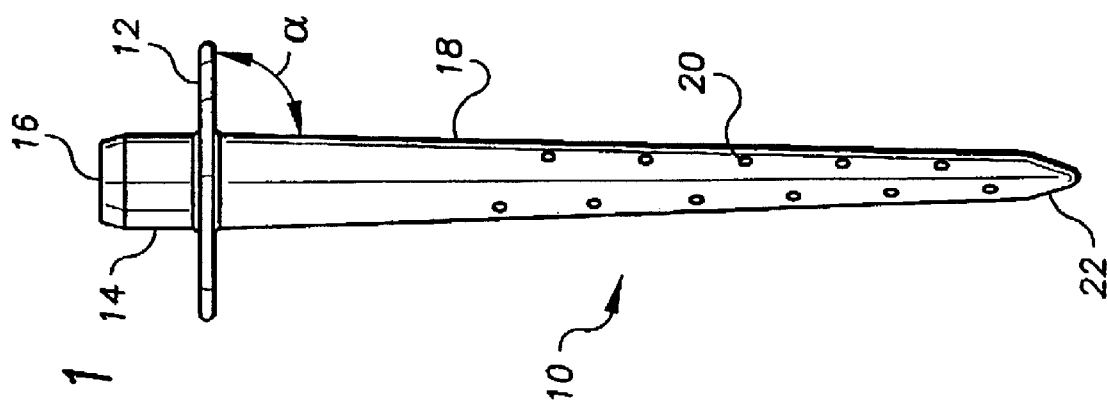
FIG. 1 is a side view of an injector in accordance with a preferred embodiment of the invention.

Referring to FIGS. 1 and 2, an injector 10 has an outwardly and radially extending peripheral shoulder 12, an upper portion 14 extending above the shoulder to an upper inlet 16, and a lower portion 18 having a plurality of outlet holes 20 and extending below the shoulder to a lower end 22 so that at least a lowermost section of lower portion 18 is tapered. The length of upper portion 14 is preferably about ¾–1 inch. The overall length of injector 10 is preferably about 10–12 inches. In the illustrated embodiment, a substantial section of lower portion 18 extending between shoulder 12 and lower end 22 has a very slight taper. Angle α, as indicated in FIG. 1, is preferably about 92–95°. Lower end 22 is preferably more tapered and terminates in a rounded lowermost tip.

Figure 3:
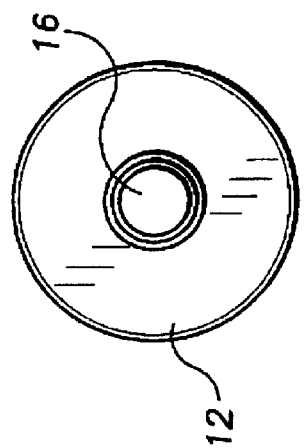
FIG. 3 is a top view of the injector of FIGS. 1 and 2.

Referring to FIG. 3, this top view shows shoulder 12 as being preferably annular in shape. Upper inlet 16 is shown as having a circular perimeter. Shoulder 12 has an outside diameter of preferably at least about two times its inside diameter, most preferably about 2–4 times its inside diameter. The total area of outlet holes 20 (of which there are twenty-two in the embodiment shown in FIGS. 1 and 2) is preferably about equivalent to or greater than the area of upper inlet 16 so as to provide no restriction to flow and thus maximize speed of watering. By way of example, to approximately meet this criteria, each outlet hole 20 (assuming a circular shape) could have a diameter of 0.156 inch and upper inlet 16 could have a diameter of ¾ inch.

Figure 5:
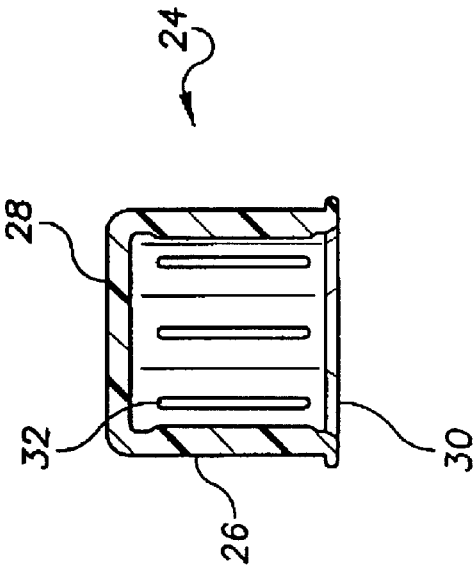
FIGS. 4, 5, 6, and 7 are side, longitudinal cross-sectional, bottom, and top views, respectively, of a cap for fitting over the upper portion of the injector.
Figure 6:
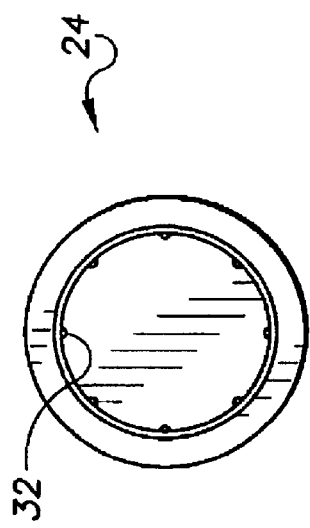
Figure 4:
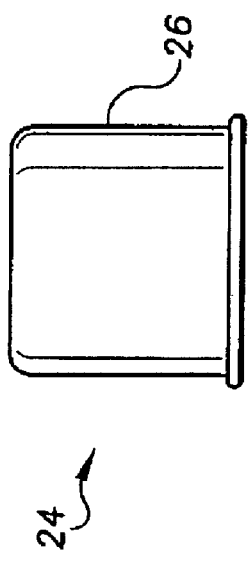
Figure 7:
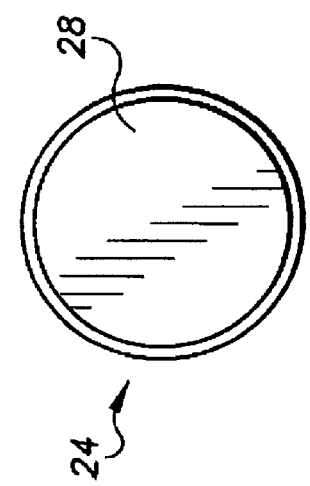

The views of FIGS. 4–7 show a cap 24 that is adapted to removably but snugly fit over upper portion 14 of injector 10 (FIGS. 1 and 2). The side view of FIG. 4 shows cap 24 as having a generally cylindrical sidewall 26, and the cross-sectional view of FIG. 5 shows cap 24 as having a closed, substantially planar top wall 28 and an open bottom 30. The interior surface of sidewall 26 has a plurality of longitudinally extending ribs 32, which assist in providing the desired snug fit over upper portion 14 (FIGS. 1 and 2). Ribs 32 are circumferentially spaced around the interior surface of the sidewall, as indicated in the bottom view of FIG. 6. The upper face of top wall 28 is shown in the top view of FIG. 7.

Referring to FIG. 8, the bottom, trunk portion of a small tree 34 has roots 36 extending into and through soil 38. Grass 40 extends upwardly from surface 42. Injector 10 is shown as it appears when not in use, with cap 24 fitted snugly but removably over upper portion 14 (indicated by a broken line) so that the bottom of the cap engages the upper face of shoulder 12. The lower face of shoulder 12 is in contact with surface 42, and lower portion 18 extends downwardly through soil 38 adjacent to roots 36. It is particularly advantageous that injector 10 can be left in position as illustrated when not in use, since this avoids the inconvenience of pulling the injector out of the soil after each use and then pushing it back into the soil for another watering.

If upper portion 14 has a length of ¾–1 inch as previously mentioned, a lawn mower blade set at a typical height would be above top wall 28 of cap 24 to thereby avoid damage to injector 10. The snug fit of cap 24 over upper portion 14 prevents cap 24 from being pulled off of the upper portion by the suction produced by a lawn mower. Cap 24 provides the advantage of keeping grass clippings, insects, and other foreign material out of injector 10. In addition, cap 24 can be used to assist in driving lower portion 18 of the injector into soil 38 if the soil has become hard and compacted. A hammer can be used to tap top wall 28 of cap 24. Top wall 28 provides a large impact area so as to distribute the downward force of a hammer over such area and thereby assist in avoiding cracking or other damage to injector 10. When driving or simply pushing injector 10 into the soil, shoulder 12 acts as a stop when it contacts surface 42, thus setting the upper and lower portions of injector 10 in their proper positions.

Cap 24 is simply pulled off of upper portion 14 by hand whenever one wants to water tree 34. As shown in FIG. 9, a reservoir 44 (shown in cross section) has an open top 46, a handle 48, and a substantially closed bottom 50 with an opening 52 sized to exteriorly and removably mate with upper portion 14 of injector 10. At least a portion of bottom 50 transversely extends from and around upper portion 14 when mated therewith. In the illustrated embodiment, and as is generally preferred, bottom 50 is substantially flat and planar. Thus, bottom 50 of the reservoir stably rests upon matted grass and surface 42.

Reservoir 44 is filled to the desired level with water, as is indicated at 54. A desirable volume capacity for reservoir 44 is about five gallons for most applications. Gravitational head pressure results in a flow of water into upper inlet 16 and through the interior of injector 10.

Water exits injector 10 through outlet holes 20 so as to percolate into soil 38. Such percolation is schematically indicated by a wavy arrow extending from one of outlet holes 20. The percolation rate will depend upon the nature and density of soil 38. Typically, five gallons of water will pass from reservoir 44, through injector 10, and into soil 38 in about 3–10 minutes. This relatively fast watering rate is due in large part to the previously discussed relationship between the total outlet hole area and the upper inlet area.

The relatively large and annular shoulder 12, having a preferred outside diameter of at least two times its inside diameter, helps prevent water from surfacing uniformly around injector 10 after it exits outlet holes 20. Water that surfaces in this manner can cause erosion of soil around injector 10 near surface 42, especially in mellow soil having a soft and loamy consistency. Such mellow soil is highly desirable around roots 36 of tree 34.

Referring to FIG. 10, this bottom view of reservoir 44 as removed from injector 10 shows the periphery 56 of bottom 50. Opening 52 is closely adjacent to periphery 56 for two reasons. First, such location of opening 52 allows positioning of reservoir 44 closer to the tree, as is clearly apparent from FIG. 9. Second, it should also be apparent from FIG. 9 that after watering is finished, such location of opening 52 in conjunction with the large diameter shoulder 12 enables the user to place his or her foot on the exposed portion of shoulder 12 when removing reservoir 44 from upper portion 14. This can prevent pulling injector 10 out of the ground.

One additional advantage of the present invention is that it allows watering several trees at the same time for the most efficient use of time. Each of several trees can have an injector positioned as illustrated in FIGS. 8 and 9. Several reservoirs can be mated with respective injectors and filled with water to maximize efficiency in watering all of the trees. Of course, if one has only one reservoir, it is a simple matter to water one tree at a time. Since watering of a tree takes only a few minutes, as discussed above, watering a number of trees is still a fast and efficient operation.

With respect to materials of construction, injector 10 and cap 24 are preferably comprised of a moldable and substantially rigid plastic, such as high-density polyethylene. Reservoir 44 is preferably comprised of a plastic sufficiently flexible so that reservoir opening 52 will sealingly mate with upper portion 14 of the injector. In this regard, the diameter of opening 52 could be slightly smaller in diameter than the outside diameter of upper portion 14 to provide the best seal and minimize leakage. Obviously, many modifications and variations of the present invention are possible in light of the above teachings. It is, therefore, to be understood that within the scope of the appended claims, the invention can be practiced otherwise than as specifically described.

That which is claimed is:

1. An irrigation apparatus comprising:
   a tubular injector having a single outwardly and radially extending peripheral shoulder, an upper portion extending above the shoulder to an upper inlet, and a lower portion having a plurality of outlet holes and extending below the shoulder to a lower end so that at least a lowermost section of the lower portion is tapered; and
   a reservoir having an open top and a substantially closed bottom with an opening exteriorly and removably mated with the upper portion of the tubular injector, such that said bottom engages the shoulder.

2. An irrigation apparatus as recited in claim 1 wherein the shoulder is substantially annular in shape and has an outside diameter at least about two times its inside diameter.

3. An irrigation apparatus as recited in claim 2 wherein the outside diameter of the shoulder is about 2–4 times its inside diameter.

4. An irrigation apparatus as recited in claim 1 wherein the total area of the outlet holes is about equivalent to or greater than the area of the upper inlet.

5. An irrigation apparatus as recited in claim 1 wherein at least a portion of the bottom of the reservoir transversely extends from and around the upper portion of the injector when mated with such upper portion.

6. An irrigation apparatus as recited in claim 5 wherein the bottom of the reservoir is substantially flat and planar.

7. An irrigation apparatus as recited in 6 wherein the bottom of the reservoir has a periphery and the opening is closely adjacent to such periphery.

8. An irrigation apparatus as recited in claim 1 further comprising a cap for removably but snugly fitting over the upper portion of the injector, wherein the cap has an open bottom, a cylindrical sidewall, and a closed, substantially planar top wall.

9. An irrigation apparatus as recited in claim 8 wherein the sidewall has an interior surface with a plurality of longitudinally extending ribs.

10. An irrigation apparatus as recited in claim 8 wherein the injector and cap are comprised of a substantially rigid plastic and the reservoir is comprised of a plastic sufficiently flexible so that the reservoir opening will sealingly mate with the upper portion of the injector.

11. An irrigation apparatus as recited in claim 1 wherein the shoulder is substantially flat and planar.

\* \* \* \* \*